US008856644B1

(12) United States Patent
Pereira et al.

(10) Patent No.: US 8,856,644 B1
(45) Date of Patent: Oct. 7, 2014

(54) SYSTEM, METHOD, AND ARCHITECTURE FOR DISPLAYING A DOCUMENT

(75) Inventors: Luiz Pereira, New York, NY (US); Edgard Lindner, New York, NY (US); Lily Xia, New York, NY (US); Kevin Markman, New York, NY (US)

(73) Assignee: Google Inc., Mountain View, CA (US)

( * ) Notice: Subject to any disclaimer, the term of this patent is extended or adjusted under 35 U.S.C. 154(b) by 66 days.

(21) Appl. No.: 13/247,223

(22) Filed: Sep. 28, 2011

Related U.S. Application Data

(63) Continuation of application No. 13/207,176, filed on Aug. 10, 2011.

(60) Provisional application No. 61/454,276, filed on Mar. 18, 2011.

(51) Int. Cl.
*G06F 17/21* (2006.01)
*G06F 17/27* (2006.01)

(52) U.S. Cl.
USPC ........... 715/243; 715/234; 715/239; 715/248; 715/249

(58) Field of Classification Search
USPC .......................... 715/234, 239, 243, 248, 249
See application file for complete search history.

(56) References Cited

U.S. PATENT DOCUMENTS

| | | | |
|---|---|---|---|
| 4,889,439 A * | 12/1989 | Cook et al. .................... 400/706 |
| 5,111,397 A | 5/1992 | Chirokas | |
| 5,381,523 A | 1/1995 | Hayashi | |
| 5,675,788 A | 10/1997 | Husick et al. | |
| 5,694,609 A * | 12/1997 | Murata ......................... 715/210 |
| 5,860,073 A | 1/1999 | Ferrel et al. | |
| 5,895,476 A * | 4/1999 | Orr et al. ...................... 715/202 |
| 6,025,836 A | 2/2000 | McBride | |
| 6,717,593 B1 * | 4/2004 | Jennings ....................... 715/760 |
| 7,106,469 B2 | 9/2006 | Simpson et al. | |
| 7,284,199 B2 | 10/2007 | Parasnis et al. | |
| 7,487,448 B2 * | 2/2009 | Emerson et al. .............. 715/255 |
| 7,836,148 B2 * | 11/2010 | Popp et al. .................... 709/217 |
| 7,920,894 B2 * | 4/2011 | Wyler ......................... 455/552.1 |
| 2008/0092066 A1 * | 4/2008 | Edlund et al. ................. 715/760 |

OTHER PUBLICATIONS

Wang et al, Google Wave Operational Transformation, Jul. 1, 2010, 1-6, retrieved from the Internet Feb. 14, 2012: http://wave-protocol.googlecode.com/hg/whitepapers/operational-transform/operational-transform.html.

Danilatos, Demonstration Doodad, with a few different variations of rendering and interactive behaviour, Dec. 24, 2012, 1-3, retrieved from the Internet May 24, 2012: http://code.google.com/p/wave-protocol/source/browse/src/org/ waveprotocol/wave/client/editor/examples/img/MyDoodad.java.

(Continued)

*Primary Examiner* — Stephen Hong
*Assistant Examiner* — Wilson Tsui
(74) *Attorney, Agent, or Firm* — Ropes & Gray LLP

(57) ABSTRACT

Data defining a document is received from an online document processing service, and a plurality of elements within the document is identified. The plurality of elements may comprise paragraphs, lines of text, images, tables, headers, footers, footnotes, footnote reference information, etc. For each of the plurality of elements, a respective object comprising a layout function and a render function is generated. An object corresponding to an element is invoked to generate layout data associated with the element, and the element is rendered based on the layout data.

12 Claims, 8 Drawing Sheets

(56) References Cited

OTHER PUBLICATIONS

Chitu, Footnotes in GoogleDocs, Oct. 17, 2008, XP055028085, retrieved from the Internet May 24, 2012: http://googlesystem.blogspot.com/2008/10/footnotes-in-google-docs.html.

Peels et al., Document Architecture and Text Formatting, Acm Transactions on Office Information Systems, XX, XX, 3 Oct. 1, 1985, 347-369.

Danilatos, Riche Text Editor—Message dated Jun. 10, 2010 8:57am, Wave Protocol Group Discussion Forum, Jun. 10, 2010, XP055027976, retrieved from the Internet May 23, 2012: https://groups.google.com/group/wave-protocol/browse_thread/thread/73608bf7a13f2385.

Nichols et al., High-Latency, Low-Bandwidth Windowing in the Jupiter Collaboration System, UIST '95. 8th Annual Symposium on User Interface Software and Technology. Proceedings of the ACM Symposium on User Interface Software and Technology, Nov. 14-17, 1995, 111-120.

Brouwer et al., MathDox editor, Electronic Proceedings MathUI 2009, 2009, XP55028009, retrieved from the Internet May 23, 2012: http://www.win.tue.nl/hansc/mde.pdf.

International Search Report and Written Opinion issued in PCT/US2012/028279 on Jun. 6, 2012.

International Search Report and Written Opinion issued in PCT/US2012/028102 on Jun. 5, 2012.

Hearnden, Wave Editor & Document Renders, A talk by Dave Hearnden at the Wave Summit captured in video on YouTube Nov. 12, 2010, retrieved from the Internet May 23, 2012: http://youtu.be/EuXApEullzc.

Unpublished U.S. Appl. No. 13/206,896, filed Aug. 10, 2011, 39 pages.

Unpublished U.S. Appl. No. 13/207,051, filed Aug. 10, 2011, 38 pages.

Unpublished U.S. Appl. No. 13/207,117, filed Aug. 10, 2011, 31 pages.

\* cited by examiner

SYSTEM, METHOD, AND ARCHITECTURE FOR DISPLAYING A DOCUMENT

This application is a continuation of prior application Ser. No. 13/207,176 filed Aug. 10, 2011, which is hereby incorporated by reference.

This application claims the benefit of U.S. Provisional Patent Application No. 61/454,276, filed Mar. 18, 2011, which is hereby incorporated by reference herein.

TECHNICAL FIELD

This specification relates generally to systems and methods for processing documents, and more particularly to systems and methods for displaying documents.

BACKGROUND

Online document processing services allow users to create and manipulate documents via the Internet, and store the documents at a remote location. Typically, a user accesses an online document processing service using a web browser operating on a computer or other device. Many existing document management services offer common word processing functions, including text editing, text searching, etc. By storing a document at the remote location, a user can access the document from any location, using a computer or other user device that has access to the Internet.

SUMMARY OF THE INVENTION

In accordance with an embodiment of the invention, data defining a document is received from an online document processing service, and a plurality of elements within the document are identified. The plurality of elements may include paragraphs, lines of text, images, tables, headers, footers, footnotes, footnote reference information, etc. For each of the plurality of elements, a respective object including a layout function and a render function is generated. An object corresponding to an element is invoked to generate layout data associated with the element, and the element is rendered based on the layout data.

An object corresponding to a particular element may include a programming class including one or more properties that define and store the state of the particular element. An object corresponding to a particular element may include a layout function that defines one or more calculations for displaying the particular element. An object corresponding to an element may also include a render function adapted to modify the HyperText Markup Language ("HTML") of a webpage based on the layout data associated with the element. Accordingly, the HTML of a webpage may be modified based on the layout data associated with the element.

In one embodiment, objects associated with the plurality of elements are organized in a hierarchical relationship.

In accordance with another embodiment, an apparatus is provided, including means for receiving data defining a document from an online document processing service, means for identifying a plurality of elements within the document, and means for generating, for each of the plurality of elements, a respective object including a layout function and a render function. The apparatus also includes means for invoking an object corresponding to an element, to generate layout data associated with the element, and means for rendering the element based on the layout data.

In accordance with another embodiment, a system is provided which includes a document stored in a memory, wherein the document includes a plurality of elements. The system further includes a plurality of first objects stored in the memory, wherein each object corresponds to a respective element and includes a layout function for laying out the respective element and a render function for rendering the respective element. The system also includes a second object, stored in the memory, for activating at least one of the first objects to layout and render a corresponding element.

These and other advantages of the present disclosure will be apparent to those of ordinary skill in the art by reference to the following Detailed Description and the accompanying drawings.

DETAILED DESCRIPTION

Figure 1:
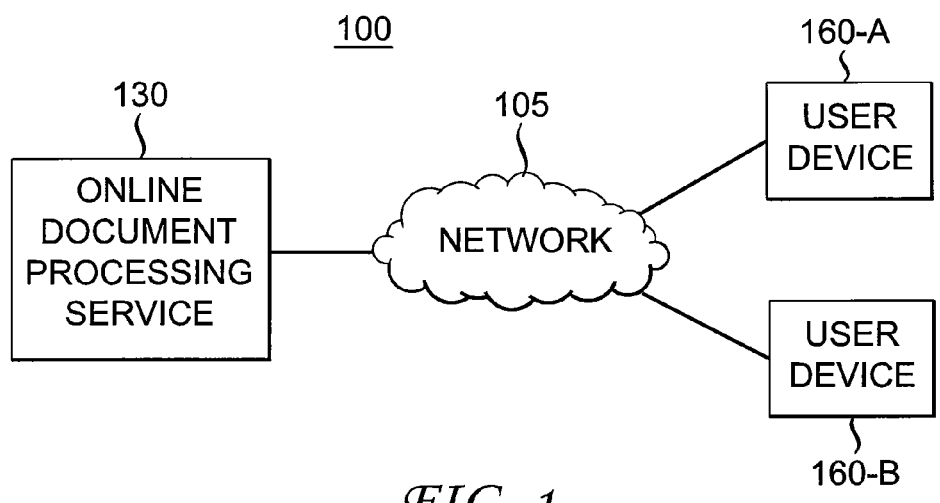
FIG. 1 shows a communication system that may be used to provide document processing services in accordance with an embodiment.

FIG. 1 shows a communication system 100 that may be used to provide document processing services in accordance with an embodiment. Communication system 100 includes a network 105, an online document processing service 130, and user devices 160-A, 160-B, etc. For convenience, the term "user device 160" is used herein to refer to any one of user devices 160-A, 160-B, etc. Accordingly, any discussion herein referring to "user device 160" is equally applicable to each of user devices 160-A, 160-B, etc. Communication system 100 may include more or fewer than two user devices.

In the exemplary embodiment of FIG. 1, network 105 is the Internet. In other embodiments, network 105 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may include a combination of different types of networks.

Online document processing service 130 provides document processing services to users via network 105, enabling users to create, display, and edit documents remotely. For example, online document processing service 130 may provide online word processing services, allowing users to create, store, and edit text documents and other types of documents. Online document processing service 130 may be accessible via a World Wide Web page that may be viewed using a conventional Web browser, for example. A user may be required to log into a respective user account to access his or her document(s). Online document processing service 130 may offer common word processing features such as text editing, text searching, table creation and editing, etc. Online document processing service 130 may also provide other functions such as image creation and editing, spreadsheet management, etc. Online document processing service 130 may grant to a user access rights with respect to a document, such as viewing and editing rights.

User device 160 may be any device that enables a user to communicate via network 105. User device 160 may be connected to network 105 through a direct (wired) link, or wirelessly. User device 160 may have a display screen (not shown) for displaying information. For example, user device 160 may be a personal computer, a laptop computer, a workstation, a mainframe computer, etc. Alternatively, user device 160 may be a mobile communication device such as a wireless phone, a personal digital assistant, etc. Other devices may be used.

Figure 2:
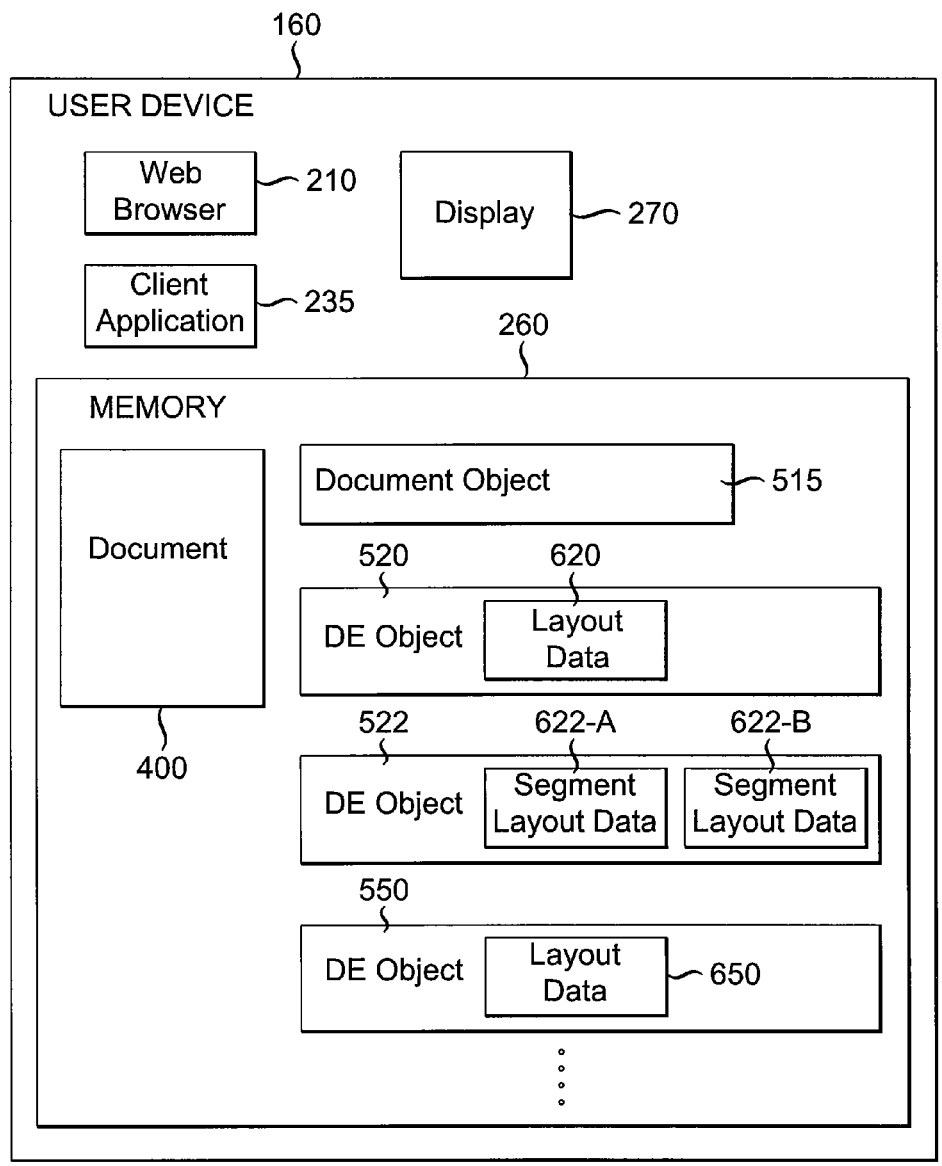
FIG. 2 shows functional components of an exemplary user device in accordance with an embodiment.

FIG. 2 shows functional components of an exemplary user device 160 in accordance with an embodiment. User device 160 includes a web browser 210 and a display 270. Web browser 210 may be a conventional web browser used to access World Wide Web sites via the Internet, for example. Display 270 displays documents, images, Web pages, and other information to a user. For example, a text document that a user creates or edits may be displayed on display 270.

User device 160 also includes a client application 235 and a memory 260. Client application 235 may examine a document and generate objects associated with various elements in the document. Memory 260 is used by components of user device 160 to store various types of data, including documents, objects, software code, etc. Examples of documents and objects that may be stored in memory 260 are illustrated in FIG. 2 and described below.

Figure 3:
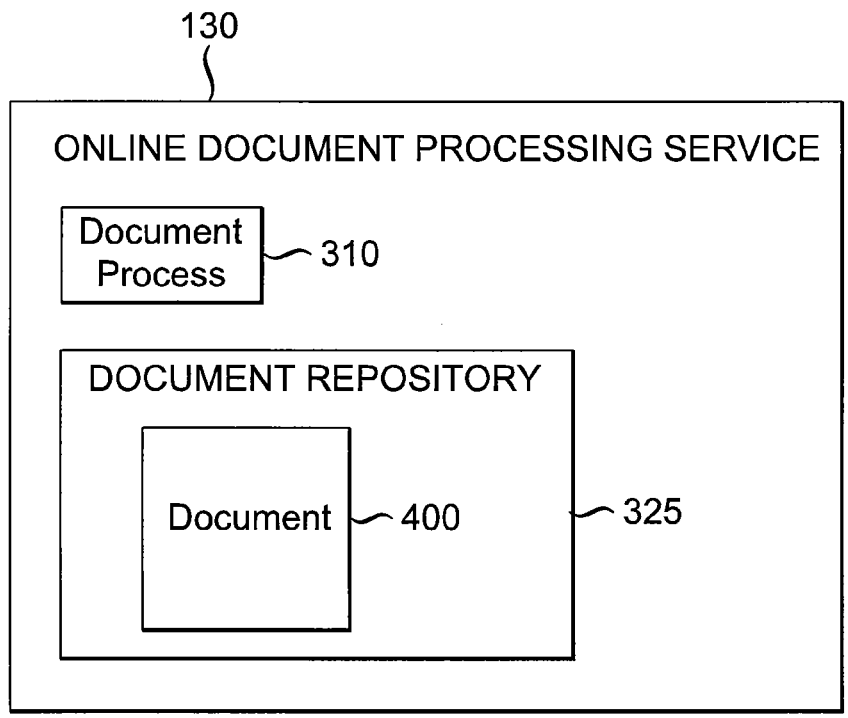
FIG. 3 shows functional components of an online document processing service in accordance with an embodiment.

FIG. 3 shows functional components of online document processing service 130 in accordance with an embodiment. Online document processing service 130 includes a document process 310 and a document repository 325. Document process 310 manages documents and performs operations requested by users, such as creating documents, editing text, performing text searches, etc. Documents created by users are stored in document repository 325. A document created by a user may be stored in association with his or her user account, for example. Multiple versions of a user's document may be stored in document repository 325.

In accordance with the embodiment of FIG. 1, a user may access online document processing service 130 and create and/or edit a document. For example, a user may employ browser 210 to access a World Wide Web site maintained by online document processing service 130. In a well-known manner, the user may be required to log into a user account to access his or her documents. The user may be required to authenticate his or her identity, e.g., by entering a user name and password, before accessing his or her user account and documents associated with the account. Online document processing service 130 may verify the user's access rights with respect to a document before granting the user access to the document.

Figure 4:
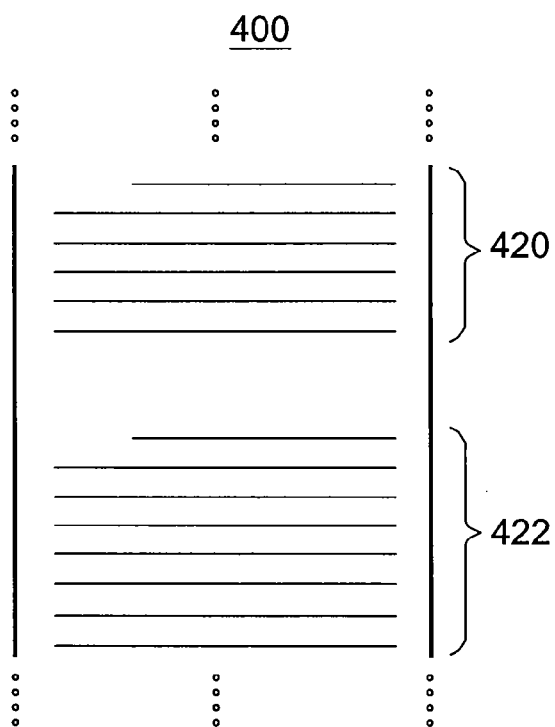
FIG. 4 shows a document in accordance with an embodiment.

Suppose, for example, that a user employs web browser 210 to access online document processing service 130 and creates a new document, such as document 400 illustrated in FIG. 4. In the illustrative embodiment, document 400 includes text, including paragraphs 420 and 422. In various embodiments, a document may include lines of text, images, tables, headers, footers, footnotes, footnote reference information, pages, and/or other elements. Online document processing service 130 stores document 400, or data representing document 400, in document repository 325, as shown in FIG. 3. Online document processing service 130 may store a document model representing document 400, for example. The user may subsequently employ user device 160, or another device, to access document 400 via the Internet.

A well-known technique used by online document processing services to display a document on a user device includes transmitting data adapted to cause the user device to display all or a portion of the document on a Web page. For example, online document processing service 130 may transmit to browser 210 a request, in the form of HyperText Markup Language (HTML), adapted to cause browser 210 to display a representation of document 400. In response, browser 210 displays a representation of all or a portion of document 400.

Existing online document processing services lay out a selected page of a document in its entirety. If a change is made to the page, the entire page is laid out again in its entirety. This process can be unacceptably slow for users, particularly in a relatively limited development environment such as a web browser or mobile application.

In one embodiment of the invention, user device 160 lays out and renders elements of a document using an architecture based on a hierarchy of objects. As used herein, the term "element" means an element of a document such as a paragraph, a line of text, an image, a table, a header, a footer, a footnote, footnote reference information, a page, etc. Objects and the hierarchical relationship between various objects are described below.

An object is a programming class that includes a set of properties that define and store the state of an associated element. For example, an object associated with a particular paragraph may include properties defining the first and last alphanumeric characters of the paragraph. An object also includes functions and methods for manipulating the properties of the object. For example, an object associated with a paragraph may include functions and/or methods for determining whether the paragraph's position collides with a position of another element, finding a cursor location, drawing a new line at the end of the paragraph, etc.

Each object includes a layout function that defines calculations used to display the corresponding element. For example, an object associated with a paragraph includes a layout function for determining where to place each line in the paragraph and whether the paragraph can fit into a given amount of space provided. An object corresponding to a line of text includes a layout function for determining where to place each word in the line. The layout function of an object generates layout data representing the layout of the associated element. For example, an object associated with a paragraph generates layout data indicating which alphanumeric characters are to be placed on which lines of the paragraph. When an object generates layout data, the layout data is stored temporarily within the object itself.

Each object also includes a render function to render the associated element. For example, an object's render function may modify the HyperText Markup Language ("HTML") of a webpage based on layout data associated with a particular element, causing a web browser to render the element. Alternatively, an object's render function may define one or more vectors for displaying an element (as used in the HTML5 Canvas element and other similar tools).

Objects may be organized in a hierarchical relationship. For example, an object responsible for a document as a whole may be a parent object with respect to objects associated with various paragraphs, tables, images, footnotes, footnote reference information, etc., within a document. An object responsible for a paragraph may have child objects responsible for lines of text within the paragraph. A parent object keeps track of its own child objects. An object responsible for a table may have child objects responsible for rows within the table, each of which has child objects responsible for cells within the respective rows. An object responsible for a cell may in turn have a child object responsible for another table stored within the cell.

An object responsible for a document as a whole keeps track of the elements within the document, and the relationships and locations of the elements with respect to each other. The object responsible for a document also keeps track of the number of pages in the document, and activates relevant child objects in order to display a particular page of the document on a display device. The object responsible for a document may determine which elements within the document belong on a current page and instruct the corresponding objects to render those elements, for example.

Figure 5:
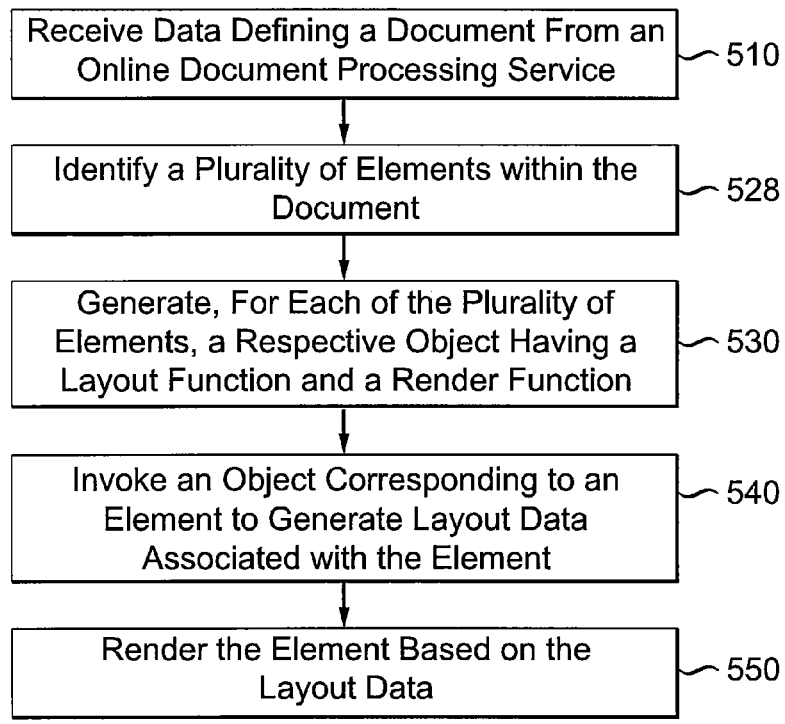
FIG. 5 is a flowchart of a method for providing document processing services in accordance with an embodiment.

The architecture described above may be used to display a current page of a document. In accordance with an embodiment, one or more elements within a document maintained by an online document processing service are identified, laid out, and rendered on user device 160. FIG. 5 is a flowchart of a method for laying out and rendering one or more elements of a document on a user device, in accordance with an embodiment.

At step 510, data defining a document is received from online document processing service 130. When document 400 is created, for example, or when the user subsequently employs user device 160 to log into his or her account and access document 400, online document processing service 130 transmits data representing the document to user device 160. For example, online document processing service 130 may transmit to user device 160 a data model corresponding to document 400. Online document processing service 130 may alternatively transmit the text of document 400 and associated metadata. Other types of data relating to a document may be provided to user device 160. Client application 235 stores document 400 in memory 260.

At step 528, a plurality of elements are identified within document 400. Client application 235 parses the data model representing document 400 to identify the structure of the document and to identify various elements within the document, such as paragraphs, tables, images, footnotes, footnote reference information, etc. Document 400 itself is identified as an element. In addition, client application 235 identifies a plurality of other elements within the document, including paragraphs 420 and 422 (shown in FIG. 4). In other embodiments, other types of elements may be identified in a document, such as images, words, lines of text, tables, headers, footers, footnotes, footnote reference information, pages, chapters, etc.

At step 530, for each of the plurality of elements, a respective object having a first function for laying out the respective element and a second function for rendering the respective element is generated. Thus, client application 235 generates an object corresponding to document 400, referred to herein as a "document object." The document object includes a layout function and a render function for document 400. The document object also includes information defining the relationships between elements in document 400, such as the locations of paragraphs 420, 422, etc. The document object is stored in memory 260 as document object 515.

Client application 235 also generates an object corresponding to each element in document 400. An object corresponding to an element within a document is referred to herein as a "document element object" or "DE object." Thus, referring to FIG. 4, client application 235 generates a DE object that corresponds to paragraph 420 and has a first function for laying out paragraph 420 and a second function for rendering paragraph 420. This DE object is stored in memory 260 as DE object 520. Client application 235 also generates a DE object that corresponds to paragraph 422 and has a first function for laying out paragraph 422 and a second function for rendering paragraph 422. This DE object is stored in memory 260 as DE object 522. Client application 235 may generate other DE objects corresponding to other elements within document 400. Client application 235 may generate a DE object for particular lines of text within paragraphs 420 and 422 as well (such DE objects are not shown).

In order to display elements associated with a selected location within document 400, document object 515 identifies one or more elements associated with the selected location. For example, document object 515 may define a page including one or more elements. In the illustrative embodiment, document object 515 determines that paragraphs 420 and 422 are associated with a current page. Document object 515 instructs objects associated with elements located before paragraph 420 to layout their respective objects (such elements are not shown).

At step 540, an object corresponding to a selected element with the document is invoked to generate layout data associated with the element. Document object 515 now invokes DE object 520 to generate layout data corresponding to paragraph 420. Document object 515 provides to DE object 520 an available page height associated with the current page. The available page height may be a predetermined available page height associated with browser 210, for example. In response, DE object 520 determines that paragraph 420 can fit within the available page height and generates layout data corresponding to paragraph 420. The layout data corresponding to paragraph 420 is stored within DE object 520, as layout data 620.

DE object 520 indicates to document object 515 an amount of vertical height that is used by the layout of paragraph 420. Document object 515 updates the available page height based on the amount of vertical height used by the layout of paragraph 420. For example, document object 515 may subtract the amount of vertical height used by the layout of paragraph 420 from the predetermined page height value to determine an updated available page height value.

Document object 515 now provides the updated available page height to DE object 522 and instructs DE object 522 to generate layout data for paragraph 422. Paragraph 422 is laid out in a manner similar to that described above, if the remaining available page height on web page 607 is sufficient to lay out and render the paragraph. If the available page height is insufficient to lay out and render the paragraph, DE object 522 lays out and renders paragraph 422 according to a method described below.

Returning now to FIG. 5, at step 550, the selected element is rendered based on the layout data. In the illustrative embodiment, document objects 515 instructs DE object 520 to render paragraph 420. In response, DE object 520 accesses layout data 620, and renders paragraph 420 based on the layout data. For example, DE object 520 may modify the HTML of the currently displayed web page based on layout data 620, causing browser 210 to display paragraph 420.

Figure 6:
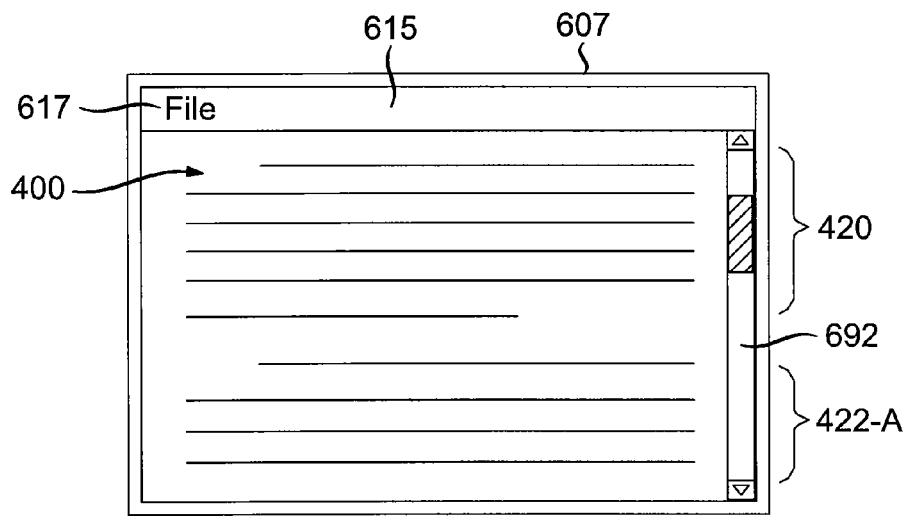
FIG. 6 shows a web page displaying elements of a document in accordance with an embodiment.

FIG. 6 shows an example of a web page 607 displaying elements of document 400, in accordance with an embodiment. Paragraph 420 is displayed in the upper portion of web page 607. Browser 210 also displays a toolbar 615 which may display various available options and/or functions available to the user, such as a file function 417, and a scroll bar 692 that allows a user to scroll up or down within document 400.

Paragraph 422 is rendered in a manner similar to that described above, if the available page height on web page 607 is sufficient to lay out and render the paragraph. In the illustrative embodiment, however, DE object 522 determines that paragraph 422 does not fit in the available page height on web page 607. In accordance with another embodiment described below, a reduced portion of paragraph 422 is rendered on the web page when an available page height is insufficient to lay out the paragraph.

In accordance with an embodiment, when data defining a document is received from online document processing service 130, an asynchronous technique is used to identify and lay out elements in the document. Accordingly, elements within the document are identified and laid out in the manner described above, generating layout data for all identified elements in sequential order, from the beginning of the document to the end of the document. A selected page of the document is then displayed, by rendering the associated elements based on the layout data. For example, the first page of the document may be displayed. This asynchronous layout method may be performed if the layout data is generated for all the identified elements in the document before the user scrolls down or otherwise indicates a desire to view a location in the document located after the first page.

If, however, the user scrolls down or otherwise indicates a desire to view a location in the document that has not yet been laid out, a synchronous layout technique may used to lay out and display the elements. Thus, in one embodiment, when data defining a document is received from online document processing service 130, the asynchronous layout method described above is used to identify and lay out elements within the document. Document object 515 starts at the beginning of the document and instructs the DE objects associated with various elements in the document to generate layout data for their respective elements, in sequential order, in accordance with the asynchronous layout method. However, if the user scrolls down or otherwise indicates a desire to view a location in the document that has not yet been laid out, the sequential procedure is discontinued. Instead, in accordance with the synchronous layout method, elements located at and before the user's desired location are laid out, and the desired location is displayed. After the desired location has been displayed, the asynchronous (sequential) layout method is resumed and the remaining elements in the document are laid out.

Figure 7:
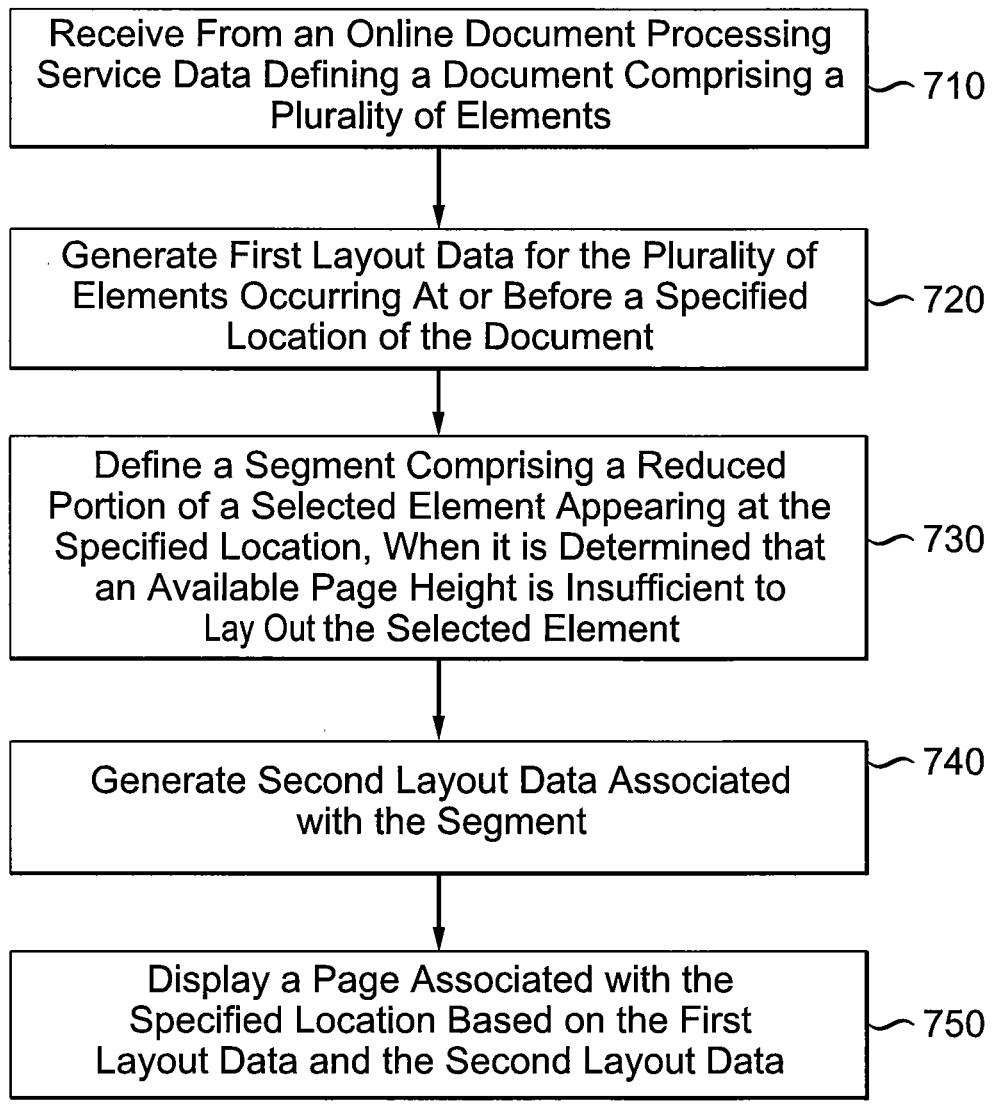
FIG. 7 is a flowchart of a method for displaying an element of a document in accordance with an embodiment.

FIG. 7 is a flowchart of a method for displaying an element of a document in accordance with an embodiment. Some of the steps of FIG. 7 correspond to certain steps described above. At step 710, data defining a document including a plurality of elements is received from an online document processing service. This step corresponds to certain activities performed in relation to steps 510 and 528 of FIG. 5. As discussed above, when document 400 is created, for example, or when the user subsequently employs user device 160 to log into his or her account and access document 400, online document processing service 130 transmits data representing the document to user device 160. For example, online document processing service 130 may transmit to user device 160 a data model corresponding to document 400.

In the manner described above, client application 235 identifies a plurality of elements in document 400, including document 400 itself and paragraphs 420 and 422. Client application 235 generates document object 515 corresponding to document 400, and a DE object for each element within the document, including DE object 520 (corresponding to paragraph 420) and DE object 522 (corresponding to paragraph 422).

Document object 515 now begins to invoke the objects associated with various elements in the document to lay out their respective elements. In accordance with the asynchronous layout method described above, document 515 invokes objects in sequential order, in the order in which their corresponding elements appear in document 400, starting at the beginning of the document. Suppose, however, that the user scrolls down to the portion of the document where paragraphs 420 and 422 are located, before layout data has been generated for these paragraphs. In response, document object 515 discontinues the asynchronous (sequential) layout method and uses the synchronous layout method described above. Document object 515 determines the location within the document that the user wishes to view, and determines which elements are associated with the desired location. Referring to FIG. 6, document object 515 determines that the user wishes to view a particular location that includes paragraphs 420 and 422.

At step 720, first layout data is generated for a plurality of elements occurring at or before a specified location of the document. Client application 235 therefore instructs document object 515 to generate layout data for those elements in document 400 that are located up to and including paragraphs 420 and 422. Document object 515 in turn instructs the DE objects corresponding to the elements up to and including paragraphs 420 and 422 to generate layout data for those elements. (Elements located in document 400 before paragraph 420 are not shown). In response, the DE objects corresponding to elements that are located before paragraph 422 generate layout data for their respective elements.

As discussed above, document object 515 now instructs DE object 520 to generate layout data for paragraph 420. In response, DE object 520 generates and stores layout data 620. Document object 515 also defines page 607 including paragraphs 420 and 422, and determines an available page height associated with current page 607. DE object 520 indicates to document object 515 an amount of vertical height that is used by the layout of paragraph 420. Document object 515 updates the available page height based on the amount of vertical height used by the layout of paragraph 420. For example, document object 515 may subtract the amount of vertical height used by the layout of paragraph 420 from a predetermined page height value to determine an updated available page height value.

Document object 515 then instructs DE object 522 to generate layout data for paragraph 422. Document object 515 provides to DE object 522 the updated available page height value representing the remaining available vertical height on the current page. In response, DE object 522 proceeds to lay out paragraph 422. In the illustrative embodiment of FIG. 6, DE object 522 determines that the remaining available page height is insufficient to lay out paragraph 422.

At step 730, a segment including a reduced portion of a selected element that appears on the specified page is defined, when it is determined that an available page height is insufficient to lay out the selected element. Referring to FIG. 6, DE object 522 defines a segment including a reduced portion of paragraph 422 that can fit within the updated available page height.

At step 740, second layout data associated with the defined segment is generated. Thus, DE object 522 generates layout data for the segment of paragraph 422 defined at step 730. The layout data is stored in DE object 522 as segment layout data 622-A. DE object 522 notifies document object 515 that the segment has been defined and laid out.

At step 750, the specified page is displayed based on the first layout data and the second layout data. To display the current page, document object 515 instructs DE object 520 to render paragraph 420, and instructs DE object 522 to render the defined segment of paragraph 422. In response, DE object 520 modifies the HTML of the current web page based on layout data 620, and DE object 522 modifies the HTML of the web page based on segment layout data 622-A. As a result, browser 210 displays web page 607 as illustrated in FIG. 6. Paragraph 420 is rendered in an upper portion of web page 607 and segment 422-A is rendered in a lower portion of the page. In the illustrative example, segment 422-A includes several lines of text representing less than the entire paragraph 422.

After page 607 is displayed, document object 515 resumes the asynchronous (sequential) layout method to lay out the remaining elements in document 400. Therefore, document 515 invokes DE objects corresponding to elements located in document 400 below paragraph 422 in sequential order until all elements in the document are laid out.

In the illustrative example, the user indicates a desire to view the succeeding page of document 400, by pressing a page down button, for example, or by scrolling down. Document object 515 therefore instructs DE object 522 to generate layout data for the remaining portion of paragraph 422. Document object 515 also provides to DE object 522 an available page height representing an available height associated with the succeeding page. In response, DE object 522 proceeds to lay out the remaining portion of paragraph 422. In the illustrative embodiment, DE object 522 determines that the available page height is sufficient to lay out the remaining portion of paragraph 422. Accordingly, DE object 522 defines a second segment including the remaining portion of paragraph 422, and generates layout data for the second segment. The layout data is stored in DE object 522 as segment layout data 622-B, as shown in FIG. 2.

Figure 8:
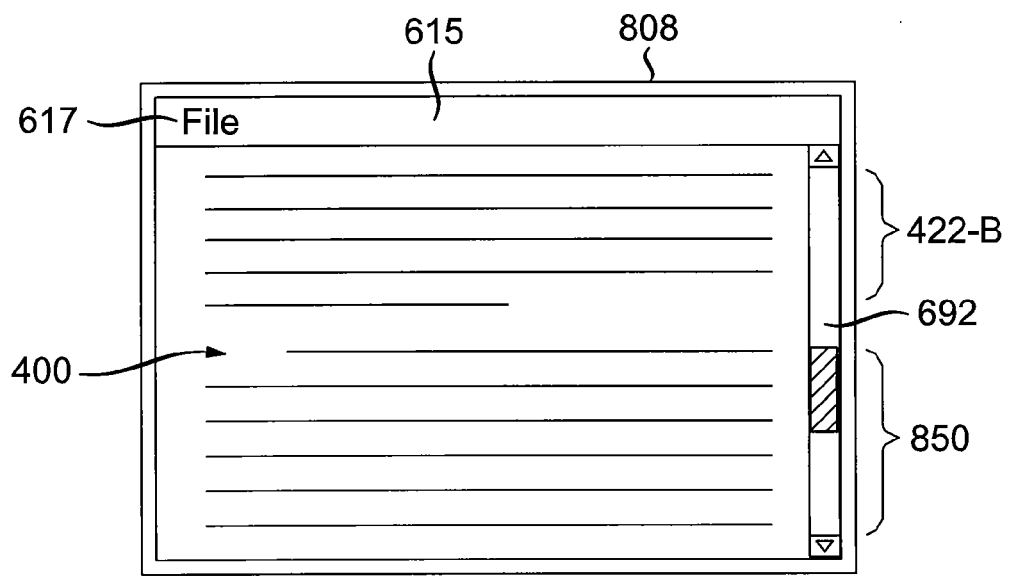
FIG. 8 shows a web page displaying elements of document in accordance with an embodiment.

To display the succeeding page, the second segment of paragraph 422 is rendered based on segment layout data 622-B. Referring to FIG. 8, web page 808 includes segment 422-B, which includes several lines of text including the remaining portion of paragraph 422. In this example, an additional paragraph 850 is also rendered in a lower portion of web page 808. A DE object 550 corresponding to paragraph 850, including layout data 650 associated with paragraph 850, are shown in FIG. 2. After page 808 is displayed, document 515 invokes DE objects corresponding to elements located in document 400 below paragraph 850 until all elements in the document are laid out, in accordance with the asynchronous layout method.

Figure 9:
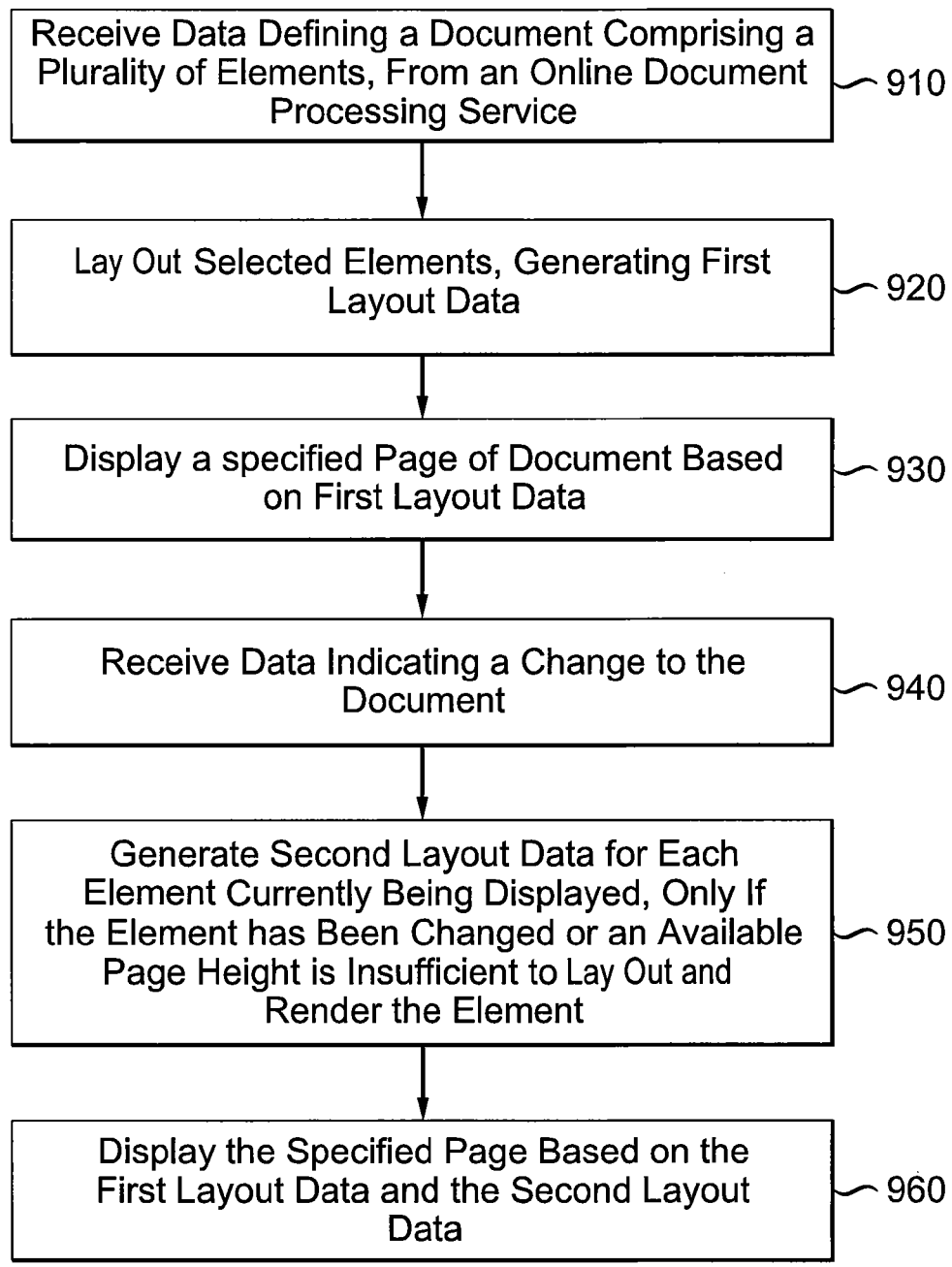
FIG. 9 is a flowchart of a method for displaying a document in accordance with an embodiment.

In accordance with another embodiment of the invention, when a change is made to an element in the document, one or more of the elements in the document are laid out a second time, and an updated page is displayed. FIG. 9 is a flowchart of a method for displaying an updated document in accordance with an embodiment. At step 910, data defining a document including a plurality of elements is received from online document processing service 130. This step corresponds to certain activities performed in relation to steps 510 and 528 of FIG. 5. As discussed above, when document 400 is created, for example, or when the user subsequently employs user device 160 to log into his or her account and access document 400, online document processing service 130 transmits data representing document 400 to user device 160. For example, online document processing service 130 may transmit to user device 160 a data model corresponding to document 400.

In the manner described above, client application 235 identifies a plurality of elements in document 400, including document 400 itself and paragraphs 420, 422, and 850. Client application 235 generates document object 515 corresponding to document 400, and a DE object for each element within the document, including DE object 520 (corresponding to paragraph 420), DE object 522 (corresponding to paragraph 422), and DE object 550 (corresponding to paragraph 850).

At step 920, selected elements are laid out, generating first layout data. At step 930, a specified page of the document is displayed based on the first layout data. In the illustrative embodiment described above with reference to FIGS. 5, 6 and 7, after the user first views page 607, including paragraph 420 and segment 422-A, the user indicates a desire to view a succeeding page. Accordingly, DE object 422 generates segment layout data 422-B, associated with segment 422-B, and DE object 550 generates layout data 650, associated with paragraph 850. Page 808 is then displayed, including segment 422-B, rendered based on segment layout data 422-B, and paragraph 850, rendered based on layout data 650, as shown in FIG. 8.

At step 940, data indicating a change to the document is received from a user device. Suppose, for example, that the user adds the word "STOP" to the last line of segment 422-B. Online document processing service 130 determines that the user has made a change to document 400, and updates document 400 accordingly. Online document processing service 130 may also provide an updated document model to user device 160.

At step 950, second layout data is generated for each element currently being displayed, only if the respective element has been changed or an available page height is insufficient to layout the respective element. In the illustrative embodiment, document object 515 identifies the elements that are currently displayed and instructs the corresponding DE objects to determine whether their respective elements must be laid out again. A respective element is laid out again only if necessary—if the element has been changed or if an available page height is insufficient to layout the element. Because segment 422-B has been changed, document object 515 instructs DE object 522 to re-lay out segment 422-B. DE object 522 re-lays out segment 422-B, updating segment layout data 622-B. DE object 522 indicates to document object 515 how much vertical space the updated segment uses. In this example, changed segment 422-B uses the same amount of vertical space that the segment previously used. Document object 515 then instructs DE object 550 to re-layout paragraph 850, if necessary, and provides to DE object 550 the available page height. DE object 550 determines that the available page height is unchanged and is therefore sufficient to layout out and render paragraph 850. DE object 550 therefore does not re-layout paragraph 850.

Figure 10:
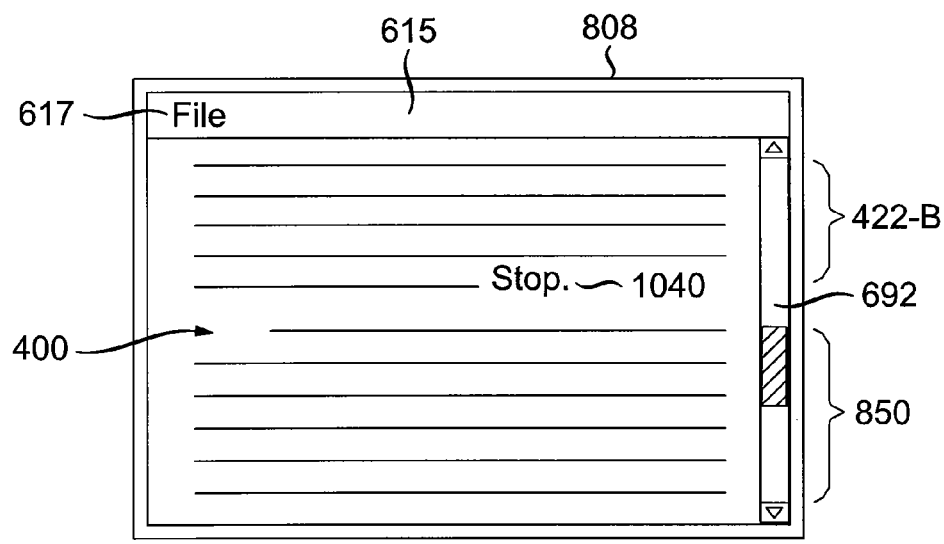
FIG. 10 shows a web page displaying elements of a document in accordance with an embodiment.

At step 960, the specified page is displayed based on the first layout data and the second layout data. Updated page 808 is accordingly displayed, including updated segment 422-B, rendered based on updated segment layout data 422-B, and paragraph 850, rendered based on layout data 650, as shown in FIG. 10. Updated segment 422-B includes added word "STOP" 1040.

In accordance with an embodiment, a DE object that determines that it is necessary to re-lay out its associated element instructs each of its child DE objects to re-layout their respective elements only if necessary. In response, each child DE object determines if it is necessary to re-lay out its associated element and re-lays out the element only if it is necessary to do so. For example, in one embodiment, each line of text of a paragraph may be an element with a corresponding DE object responsible for laying out and rendering that line of text. Supposing that a user makes a change within the paragraph, when the DE object responsible for the paragraph determines that the paragraph has been changed by the user, the DE object instructs the DE object associated with the first line of text that has been changed to re-lay out its respective line of text. That particular DE object re-lays out its line of text and informs the DE object responsible for the paragraph of any words that no longer fit on the line. The DE object responsible for the paragraph then invokes the DE object associated with the next line of text and informs it of the words that have been pushed down from the preceding line, if any. This next DE object determines whether it is necessary to re-lay out its associated line of text, and does so if necessary. This procedure is performed for each line of text in the paragraph following the user's change, until the end of the paragraph, or until a DE object determines that its associated line of text does not need to be re-laid out. In this manner, the quantity of data that is re-laid out is minimized.

In various embodiments, the method steps described herein, including the method steps described in FIGS. 5, 7, and/or 9, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 5, 7, and/or 9. Certain steps of the methods described herein, including one or more of the steps of FIGS. 5, 7, and/or 9, may be performed by a server or by another processor in a network-based cloud-computing system. Certain steps of the methods described herein, including one or more of the steps of FIGS. 5, 7, and/or 9, may be performed by a client computer in a network-based cloud computing system. The steps of the methods described herein, including one or more of the steps of FIGS. 5, 7, and/or 9, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 5, 7, and/or 9, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 11:
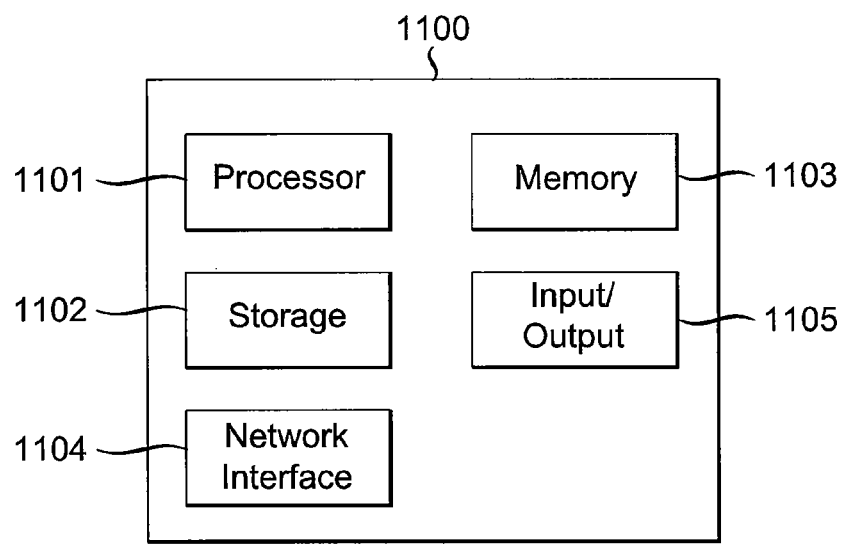
FIG. 11 shows components of a computer that may be used to implement the invention.

A high-level block diagram of an exemplary computer that may be used to implement systems, apparatus and methods described herein is illustrated in FIG. 11. Computer 1100 includes a processor 1101 operatively coupled to a data storage device 1102 and a memory 1103. Processor 1101 controls the overall operation of computer 1100 by executing computer program instructions that define such operations. The computer program instructions may be stored in data storage device 1102, or other computer readable medium, and loaded into memory 1103 when execution of the computer program instructions is desired. Thus, the method steps of FIGS. 5, 7, and/or 9 can be defined by the computer program instructions stored in memory 1103 and/or data storage device 1102 and controlled by the processor 1101 executing the computer program instructions. For example, the computer program instructions can be implemented as computer executable code programmed by one skilled in the art to perform an algorithm defined by the method steps of FIGS. 5, 7, and/or 9. Accordingly, by executing the computer program instructions, the processor 1101 executes an algorithm defined by the method steps of FIGS. 5, 7, and/or 9. Computer 1100 also includes one or more network interfaces 1104 for communicating with other devices via a network. Computer 1100 also includes one or more input/output devices 1105 that enable user interaction with computer 1100 (e.g., display, keyboard, mouse, speakers, buttons, etc.).

Processor 1101 may include both general and special purpose microprocessors, and may be the sole processor or one of multiple processors of computer 1100. Processor 1101 may include one or more central processing units (CPUs), for example. Processor 1101, data storage device 1102, and/or memory 1103 may include, be supplemented by, or incorporated in, one or more application-specific integrated circuits (ASICs) and/or one or more field programmable gate arrays (FPGAs).

Data storage device 1102 and memory 1103 each include a tangible non-transitory computer readable storage medium. Data storage device 1102, and memory 1103, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EE-PROM), compact disc read-only memory (CD-ROM), digital versatile disc read-only memory (DVD-ROM) disks, or other non-volatile solid state storage devices.

Input/output devices 1105 may include peripherals, such as a printer, scanner, display screen, etc. For example, input/output devices 1105 may include a display device such as a cathode ray tube (CRT) or liquid crystal display (LCD) monitor for displaying information to the user, a keyboard, and a pointing device such as a mouse or a trackball by which the user can provide input to computer 1100.

Any or all of the systems and apparatus discussed herein, including online document processing service 130, user device 160, and components thereof, including web browser 210, display 270, client application 235, memory 260, document process 310, and document repository 325, may be implemented using a computer such as computer 1100.

One skilled in the art will recognize that an implementation of an actual computer or computer system may have other structures and may contain other components as well, and that FIG. 11 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
 accessing, by a user device, data defining a document maintained at an online document processing service;
 identifying a plurality of elements within the document, the plurality of elements including a first paragraph and a second paragraph;
 generating a hierarchy of objects associated with the plurality of elements, the hierarchy of objects comprising a plurality of objects including a parent object, wherein generating a hierarchy of objects comprises:
  generating, for each of the plurality of elements, a respective object comprising a layout function and a render function, including a first object corresponding to the first paragraph and a second object corresponding to the second paragraph, the first object being different from the second object, wherein each of the first and second objects comprises:
   a programming class comprising one or more properties that define a first alphanumeric character of the corresponding paragraph and a last alphanumeric character of the corresponding paragraph;
   a layout function defining one or more calculations for determining a location of one or more lines in the corresponding paragraph and whether the corresponding paragraph can fit into an available page height; and
   a render function adapted to modify a HyperText Markup Language ("HTML") of a webpage based on layout data associated with the corresponding paragraph; and
  generating a parent object adapted to determine a location of the document, determine an object corresponding to a particular one of the plurality of elements that is associated with the location, and invoke the determined object to lay out and render the particular one of the plurality of elements;
 determining, by the parent object, a selected location within the document;
 in response to determining the selected location:
  determining that the first paragraph and the second paragraph are associated with the selected location;
  invoking, by the parent object, the first object to generate first layout data associated with the first paragraph;
  invoking, by the parent object, the second object to generate second layout data associated with the second paragraph;
  rendering, by the first object, the first paragraph based on the first layout data; and
  rendering, by the second object, the second paragraph based on the second layout data.

2. The method of claim 1, further comprising:
 rendering only a portion of the document ending at the bottom of a page currently being viewed.

3. The method of claim 1, further comprising:
 determining that the first paragraph does not fit in an available height associated with a page;
 defining a segment of the first paragraph that fits within the available height;
 generating segment layout data associated with the segment of the first paragraph; and
 rendering the segment based on the segment layout data.

4. The method of claim 3, further comprising:
 determining that a second page is being viewed;
 defining a second segment of the first paragraph that fits on the second page;
 generating second segment layout data associated with the second segment; and
 rendering the second segment based on the second segment layout data.

5. The method of claim 4, further comprising:
 rendering only a portion of the document ending at the bottom of the second page.

6. The method of claim 1, wherein a one-to-one relationship exists between each element among the plurality of elements, and the corresponding object.

7. The method of claim 1, further comprising:
 identifying a line of text within the first paragraph; and
 generating a line object corresponding to the line of text, the line object comprising a second layout function for laying out the line of text, wherein the first object and the line object function in a hierarchical relationship;
 the method further comprising:
  invoking, by the first object, the line object to lay out the line of text.

8. A non-transitory computer readable medium having program instructions stored thereon, the instructions capable of execution by a processor and defining the steps of:
 accessing data defining a document maintained at an online document processing service;
 identifying a plurality of elements within the document, the plurality of elements including a first paragraph and a second paragraph;

generating a hierarchy of objects associated with the plurality of elements, the hierarchy of objects comprising a plurality of objects including a parent object, wherein generating a hierarchy of objects comprises:
generating, for each of the plurality of elements, a respective object comprising a layout function and a render function, including a first object corresponding to the first paragraph and a second object corresponding to the second paragraph, the first object being different from the second object, wherein each of the first and second objects comprises:
a programming class comprising one or more properties that define a first alphanumeric character of the corresponding paragraph and a last alphanumeric character of the corresponding paragraph;
a layout function defining one or more calculations for determining a location of one or more lines in the corresponding paragraph and whether the corresponding paragraph can fit into an available page height; and
a render function adapted to modify a HyperText Markup Language ("HTML") of a webpage based on layout data associated with the corresponding paragraph; and
generating a parent object adapted to determine a location of the document, determine an object corresponding to a particular one of the plurality of elements that is associated with the location, and invoke the determined object to lay out and render the particular one of the plurality of elements;
determining, by the parent object, a selected location within the document;
in response to determining the selected location:
determining that the first paragraph and the second paragraph are associated with the selected location;
invoking the first object to generate first layout data associated with the first paragraph;
invoking the second object to generate second layout data associated with the second paragraph;
rendering the first paragraph based on the first layout data; and
rendering the second paragraph based on the second layout data.

9. The non-transitory computer readable medium of claim 8, further comprising instructions defining the step of:
rendering only a portion of the document ending at the bottom of a page currently being viewed.

10. The non-transitory computer readable medium of claim 8, further comprising instructions defining the steps of:
determining that the first paragraph does not fit in an available height associated with a page;
defining a segment of the first paragraph that fits within the available height;
generating segment layout data associated with the segment of the first paragraph; and
rendering the segment based on the segment layout data.

11. The non-transitory computer readable medium of claim 10, further comprising instructions defining the steps of:
determining that a second page is being viewed;
defining a second segment of the first paragraph that fits on the second page;
generating second segment layout data associated with the second segment; and
rendering the second segment based on the second segment layout data.

12. The non-transitory computer readable medium of claim 11, further comprising instructions defining the step of:
rendering only a portion of the document ending at the bottom of the second page.

* * * * *